United States Patent

Priem et al.

[11] Patent Number: 6,023,738
[45] Date of Patent: Feb. 8, 2000

[54] METHOD AND APPARATUS FOR ACCELERATING THE TRANSFER OF GRAPHICAL IMAGES

[75] Inventors: Curtis Priem, Fremont; David S. H. Rosenthal, Palo Alto; Rick Iwamoto, Cupertino, all of Calif.

[73] Assignee: NVIDIA Corporation, Sunnyvale, Calif.

[21] Appl. No.: 09/050,852

[22] Filed: Mar. 30, 1998

[51] Int. Cl.[7] ................................................. G06F 13/00
[52] U.S. Cl. ................................. 710/23; 710/33; 710/56
[58] Field of Search .......................... 710/5–36, 46–61, 710/107–125

[56] References Cited

U.S. PATENT DOCUMENTS

| | | | |
|---|---|---|---|
| 5,301,287 | 4/1994 | Herrell et al. | 710/5 |
| 5,623,692 | 4/1997 | Priem et al. | 710/3 |
| 5,655,151 | 8/1997 | Bowes et al. | 710/22 |
| 5,664,224 | 9/1997 | Davis | 710/22 |
| 5,669,013 | 9/1997 | Watanabe et al. | 711/202 |
| 5,685,611 | 11/1997 | Rosenthal et al. | 710/3 |
| 5,687,392 | 11/1997 | Radko | 710/22 |
| 5,696,990 | 12/1997 | Rosanthal et al. | 710/29 |
| 5,721,947 | 2/1998 | Priem et al. | 710/4 |
| 5,740,464 | 4/1998 | Priem et al. | 710/3 |
| 5,758,182 | 5/1998 | Rosenthal et al. | 710/3 |

*Primary Examiner*—Christopher B. Shin
*Attorney, Agent, or Firm*—Claude A.S. Hamrick; Oppenheimer Wolff & Donnelly

[57] ABSTRACT

A direct memory access (DMA) arrangement having a DMA circuit which is positioned with an input/output device, the DMA circuit including a first register for storing a reference value pointing to a first data structure established by an application program which includes details of a transfer buffer in memory in which data is stored for transfer to the I/O device, two additional registers for storing an address and a range at which the data is stored within the transfer buffer in memory, and a fourth register for storing a reference value pointing to a second data structure which includes details describing a notification area of memory at which a notification from the DMA circuit that a transfer of data has been completed may be stored.

29 Claims, 2 Drawing Sheets

METHOD AND APPARATUS FOR ACCELERATING THE TRANSFER OF GRAPHICAL IMAGES

BACKGROUND OF THE INVENTION

1. Field of the Invention

This invention relates to computer systems, and more particularly, to methods and apparatus for accelerating the transfer of data to be utilized by a computer input/output (I/O) device.

2. History of the Prior Art

In computers running modern multitasking operating systems, it has typically been necessary to call the operating system to write any data to memory-mapped input/output devices. This has been required to assure that the operations conducted by the application programs are safe and do not write over the assets of the system or other application programs. Consequently, in order to display graphics data on a computer output display, the operating system has typically conducted the transfer. This is a very slow process because it is complicated and not conducted in hardware. With the emergence of multimedia programming, the process has become too slow.

Recently, a new I/O architecture has been devised which allows direct writes by an application program to an I/O control unit which resides with and controls data transfers to I/O devices in a multitasking operating system. The I/O control unit assures that only operations which are safe are sent to I/O devices thereby allowing an application program to bypass the security furnished by the operating system without endangering the operation of the system or the assets of other applications. The architecture utilizes hardware to accomplish its operations and thus makes writing to I/O devices very much faster than prior art architectures by eliminating the very long times required to write utilizing the operating system.

When writing to an I/O device using the new architecture, an application program executing on a computer central processor causes commands including an address and data to be sent to the I/O control unit for transfer to the I/O device joined to the control unit. Since an application can know only virtual addresses without operating system assistance, the I/O control unit must furnish the physical address for the I/O device and assure that the operation is safe. Once the physical address has been determined, it is held in a register on the I/O control unit so that all subsequent commands to the same address are sent directly to the selected I/O device.

Data transfers from an application program to I/O devices in computer systems utilizing memory-mapped I/O are typically handled by the memory control unit once generated by the central processor. The application indicates to the processor where the desired data resides in virtual memory, the extent of the data, and the address to which it is to be transferred. The memory control unit translates the virtual address provided by the application to a physical address and assures that the data is in main memory before allowing the transfer to commence. The bus control unit receives the data, acquires the system bus, and transfers the data over the system bus to the I/O control unit. This allows the central processor to attend to other operations while the data is being transferred. When a significant amount of data is involved, the bus control unit transfers small increments of the data at a time over the bus to the I/O control unit and repeats the process until all of the data has been transferred to the I/O control unit.

In order to assure that data will be available to an I/O device without delay, the new architecture includes a relatively large input buffer on the I/O control unit which controls the writes to the graphics accelerator or other I/O device. This first-in first-out (FIFO) buffer allows large amounts of command data to accumulate from a myriad of small transfers from the bus control unit so that the accelerator does not have to wait for each new transfer before it can proceed. Such a solution accelerates the transfer of data from the processor to the graphics accelerator significantly by reducing the need for either the central processor or the graphics accelerator to wait for the other in order to continue with operations. The new architecture including such a FIFO input buffer is described in U.S. Pat. No. 5,696,990, entitled *Method and Apparatus for Providing Improved Flow Control For Input/Output Operations a Computer System Having a FIFO Circuit And An Overflow Storage Area,* issued Dec. 9, 1997, to Rosenthal et al.

A hardware buffer is expensive and must be finite in size; consequently, an input buffer of 128 bytes has been selected as a useful compromise for typical uses. However, where large amounts of data are being transferred as in graphics operations, it is necessary to monitor the condition of the FIFO input buffer in order to guard against overflow. If the FIFO input buffer overflows in a system such as described in which the central processor is decoupled from I/O devices, the data being transferred will be lost. For this reason it has been necessary to provide a means to indicate to the central processor when the FIFO input buffer has room to receive additional data. To accomplish this, the I/O control unit includes circuitry which keeps track of the FIFO buffer space available and furnishes this information in a local register on the I/O control unit. The central processor reads the register for the condition of the FIFO input buffer before sending any new sequence of command data to an I/O device. The need for the central processor to read the free space available in the FIFO input buffer before sending any additional data slows the transfer of the graphics data to I/O devices significantly.

It is desirable to provide an improved arrangement for rapidly transferring data to I/O devices.

It is desirable to increase the speed at which graphics data may be transferred from memory to a graphics accelerator while freeing the central processor for other activities.

SUMMARY OF THE INVENTION

It is, therefore, an object of the present invention to provide an improved method for more rapidly transferring data to input/output devices.

These and other objects of the present invention are realized by apparatus and a method for rapidly transferring data under direction of an application program to an input/output (I/O) device comprising computer implemented software means for defining a region of system memory as a transfer buffer, an I/O device including a direct memory access (DMA) circuit, the DMA circuit including storage circuitry to indicate a sequence of data in the transfer buffer to be transferred to the I/O device, storage circuitry to indicate the physical position of the transfer buffer, and means to generate a transfer status notification.

The arrangement typically defines a very large transfer buffer in main memory in which data to be transferred to an I/O device may be placed by an application process. Once the transfer buffer has been established, an application program need indicate to the DMA circuit only the data within the main memory buffer to be transferred to enable the DMA circuit to access the transfer buffer and find a particular data sequence. The DMA circuit then transfers all of the data to the I/O device without central processor intervention and provides a notification to the central processor at the notification area when the transfer is finished. This arrangement greatly accelerates such transfers and allows essentially unlimited amounts of data to be transferred to I/O devices without involving the central processor.

These and other objects and features of the invention will be better understood by reference to the detailed description which follows taken together with the drawings in which like elements are referred to by like designations throughout the several views.

DETAILED DESCRIPTION

Figure 1:
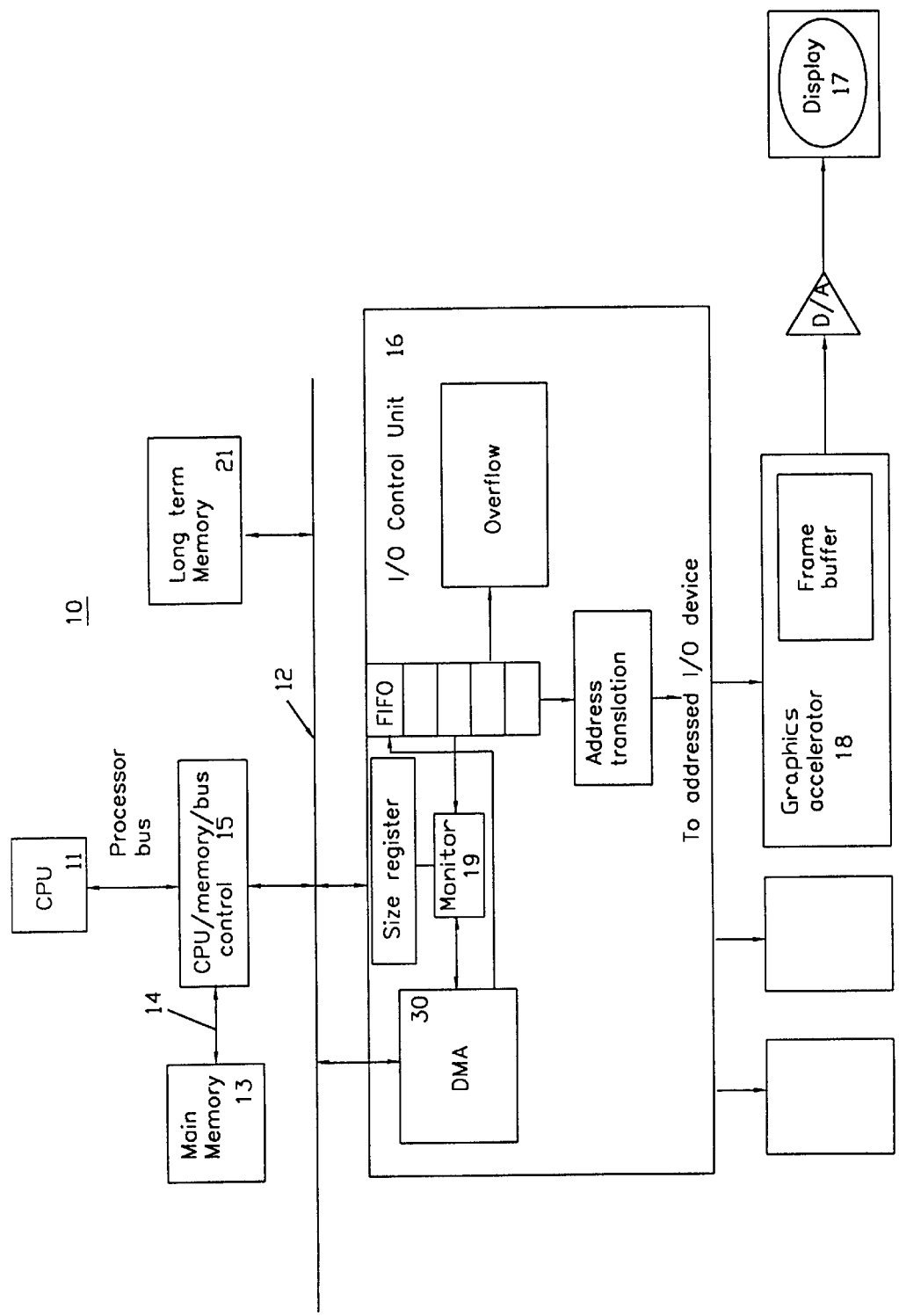
FIG. 1 is block diagram illustrating a circuit for practicing the present invention.

FIG. 1 is a block diagram illustrating a computer 10 which may utilize the present invention. The computer 10 includes a central processing unit 11, a system bus 12, main memory 13 joined to the central processing unit 11 by a high speed memory bus 14 and a bus control unit 15 which controls access to the system bus 12, long term memory 21, an I/O control unit 16 associated with various I/O devices, and an output display 17. Typically, the I/O devices may include devices such as a graphics accelerator circuit 18 for manipulating the graphics data furnished to the accelerator to generate pixel data which is stored in a frame buffer and transferred by a digital-to-analog converter circuit to operate an output display 17.

In the prior art, when the computer 10 is transferring graphics data from memory to the graphics accelerator 18, the central processing unit 11 executing operating system processes accesses the data using the virtual addresses provided by an application. The central processing unit 11 transfers the virtual addresses to a memory management unit which provides a physical address for the graphics data and signals the operating system to transfer (if necessary) pages containing that data to main memory. Then, the central processing unit 11 transfers a small portion of the data in main memory to the bus control unit 15. The bus control unit 15 buffers the data and controls its transfer to the graphics accelerator 18 via the I/O control unit 16. Typically, the bus control unit 15 stores a few bytes of data in its buffer, signals the bus 12 that it has data to transfer, acquires control of the bus 12, and sends the data to the I/O control unit 16.

In an advanced computer 10 such as that described earlier, the I/O control unit 16 may include a FIFO input buffer able to receive and store a number of such data transfers from the bus control unit 15 so that the I/O control unit 16 need not slow its processing of pixel data while waiting for new data. In general, the FIFO input buffering circuitry described in the above-mentioned patent allows data to be transferred to the I/O device much more rapidly than do prior art arrangements. However, since the central processing unit 11 functions asynchronously with respect to I/O devices, if command data overflows the FIFO input buffer of the unit 16, then the data is lost.

For this reason, the arrangement of the above-mentioned patent provides circuitry to monitor the condition of the FIFO input buffer of the graphics accelerator and allow the central processing unit to determine the amount of free space remaining in the FIFO buffer before new data is sent. By limiting the amount of data which may be transferred by the central processing unit to an amount which will fit into the FIFO input buffer free space, overflow can be eliminated. Space is also provided for overflows which do occur to eliminate any chance of data loss. The arrangement shown in FIG. 1 includes means (monitor 19) for detecting the available space in the FIFO buffer and for posting that information in a size register on the I/O control unit which the central processing unit reads before initiating any new transfer of I/O data. However, this read operation by the central processing unit requires a pause of other processor and bus processes, acquisition of the bus 12 by the central processing unit 11, and a read access across the I/O bus to assure that there is space available before the central processing unit can begin the transfer of additional data to the bus control unit 15.

Thirty-two stages capable of handling four bytes of data per stage has been found to represent an optimal size for an I/O FIFO buffer. Consequently, after sending 128 bytes of data, the central processor must read the amount of free data space available in the input buffer before sending more data. This requires that the central processor read an I/O device register to determine the size of the free space available any time large amounts of data are being sent.

In systems which provide significant graphics operations, it has become typical for more than one megabyte of data to be written to a graphics accelerator in any particular operation. Obviously, this requires that the central processor be constantly reading the amount of FIFO input buffer space available for new transfers, a process which significantly slows operations.

The present invention provides an improved method of transferring data to I/O devices. The improved method allows very large amounts of data to be transferred to an I/O device such as a graphics accelerator without using the central processing unit and eliminates the need for the central processor to read the space available in a FIFO input buffer thus significantly increasing the speed of the transfer.

To accomplish these results in the present invention, an application program defines a first large area in virtual memory to be a transfer buffer 29 (see FIG. 2) and a second small area 31 in virtual memory to hold notifications of the status of any transfer. In one embodiment, an application program desiring to transfer data to an I/O device utilizes a kernel driver for the I/O device to establish a first data structure 36 which defines the transfer buffer 29 and a second data structure 38 (shown in FIG. 2) which defines the notification area 31 of memory involved. The kernel driver receives from the application program data describing the transfer buffer by a virtual address, a range, and the application setting up the transfer buffer. The kernel driver obtains copies of the page tables from the system memory controller which may be used to provide translations from the virtual addresses furnished by the application program, places the physical address and range of the transfer buffer in the data structure, and provides a reference value to the DMA engine which points to the data structure.

By creating the first data structure defining the transfer buffer, the application initiates the process that assures that the pages are in main memory. Moreover, the kernel driver indicates to the operating system that the pages designated by the data structure as the transfer buffer memory area are locked so that they cannot be paged out of main memory. The invention then utilizes a DMA engine 30 at the I/O control unit 16 associated with the I/O device to transfer the graphics data directly from the main memory transfer buffer to the I/O device typically in response to application commands. The only use of the central processing unit is to transfer data to the buffer area of main memory in response to application write instructions, to transfer the initializing commands from the application defining a specific data transfer sequence to the DMA engine, and to read the notification area in main memory to determine the status of any DMA transfer which has commenced.

Figure 2:
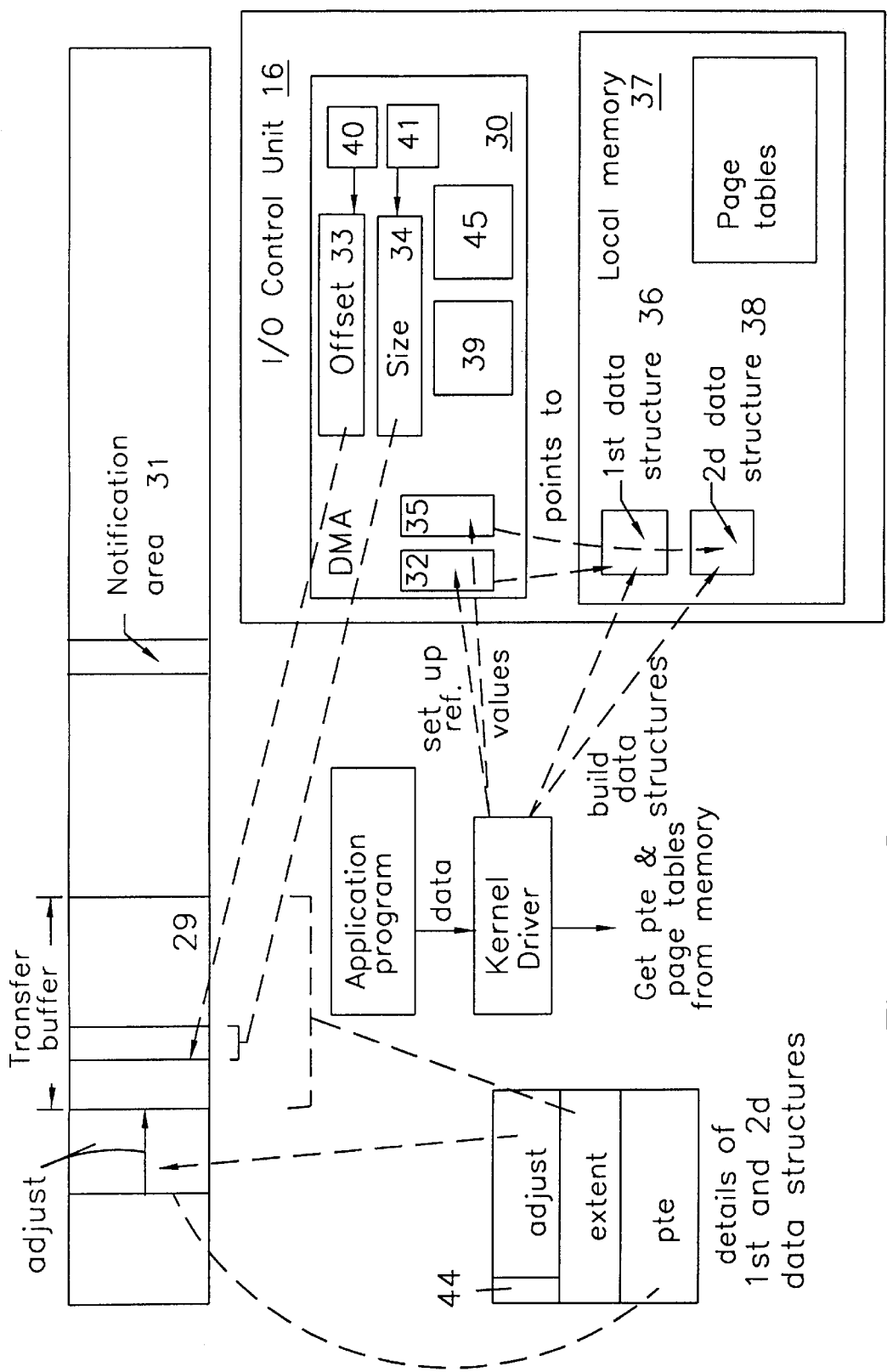
FIG. 2 is a diagram illustrating an arrangement in accordance with the invention which may be utilized in the circuit of FIG. 1.

In one embodiment of the invention shown in FIG. 2, the DMA engine 30 is positioned as a part of the I/O control unit 16 joined to the I/O device to which the data is to be transferred. In this embodiment, the DMA engine 30 includes, in addition to circuitry for accomplishing data transfers, at least four individual registers 32–35 which are utilized in carrying out the invention. A first register 32 includes a reference value pointing to the first data structure 36 which defines the transfer buffer in main memory to hold the data to be transferred to the I/O device. This reference value is furnished by the software kernel driver for the I/O device utilized by the application program to set up the first data structure defining the transfer buffer.

The data structure 36 may be placed in any portion of memory which is convenient to the operation. In the embodiment illustrated, the first data structure 36 defining the transfer buffer and the second data structure 38 defining the notification area are each conveniently stored in local memory 37 on the I/O control unit 16 adjacent the DMA engine 30. The data structure in this embodiment (shown in FIG. 2) includes one or more page table entries including the physical address in memory at which each page defining the transfer buffer begins, an adjust value indicating where the transfer buffer begins in the first memory page and an extent value indicating the length of the transfer buffer from its beginning. These values allow a transfer buffer of any convenient size to be established. For example, a transfer buffer of two megabytes may be a reasonable size for handling transfers of graphics data to a graphics accelerator device. On the other hand, the size of the transfer buffer is limited only by the amount of space available in main memory and depends entirely on the individual computer arrangement involved.

Although an application program is aware of only virtual memory addresses in a system using virtual memory, by indicating the page table entries in the data structure and copying the page tables to available off-screen memory 37 on the I/O control unit 16 as is shown in the illustrated embodiment, the DMA engine itself is made capable of accomplishing any translations necessary during the transfer without requiring an interrupt to the central processor for obtaining assistance from the operating system for address translation. This allows an application program to write the commands directly to the DMA engine without the delays attendant upon translation by the operating system. The DMA engine includes circuitry 39 which uses the page table information to translate virtual to physical addresses during transfer of the data from the buffer to the I/O device.

Of course, it is also possible to utilize the invention with the slower address translation process by the operating system typical of the prior art. If the operating system translates virtual addresses from the application to physical addresses for a transfer buffer, then these values defining the transfer buffer would be placed in the first data structure and page tables would not be required in local memory 37. It would also be possible to utilize the invention without the facility for writing directly to I/O devices if the operating system accomplished the address translations and security checks. However, such a process would be slower because it would necessitate the operating system being involved in all address translations and would eliminate the ability of an application to selectively pick different I/O devices without operating system intervention.

Thus, the result of the creation of the first data structure is a constant area in main memory at which a transfer buffer of a size limited only by main memory size is positioned. When such a data structure has been completed by the application and kernel driver, the kernel driver causes the pages designated by the data structure (or some portion thereof) to be locked down in main memory so that they cannot be removed. At this point, the data structure defines an area of main memory (designated by the adjust, extent, and page table entries) which may be used as a buffer by any I/O device associated with the DMA engine.

It should be noted that other data may also be a part of the data structure which defines a transfer buffer. For example, in one embodiment of the invention, the data structure includes an indication of where the transfer buffer is placed. Although it is especially useful for increasing the speed of transfers to I/O devices, in some situations it is desirable to be able to create a large buffer in memory other than main memory (for example, local memory 37 which is associated with the DMA engine 30 on the I/O control unit) from which the DMA engine may rapidly transfer data to other portions of an I/O device. In one case, a single bit indication 44 may be kept in the data structure for indicating either main memory or another portion of memory in which the transfer buffer is to be established. Indications using a larger number of bits may be used for selecting among other memory subsystems or buses.

In the same embodiment of the invention, the fourth register 35 holds a reference value pointing to the second data structure 38 which defines the notification area 31. The notification area in main memory is used for holding, among other things, the status of transfers of data from the transfer buffer. This second data structure 38 defines the notification area generally in the same manner as the first data structure defines the transfer buffer by an adjust, a length, a page table entry, and possibly an indication whether the notification area is a portion of main memory or local memory. In one embodiment, the adjust value is eliminated and the notification is placed at the beginning of the page indicated by the page table entry. In this embodiment, the length of the notification area is only sixteen bytes.

Since the notification area is also typically in main memory, a read of the area by the central processing unit need not transit the system I/O bus and therefore takes a very small amount of time. This is to be contrasted to the read of a register on an I/O device necessary in the arrangement described in the above-mentioned patent to determine the status of a buffer on the I/O device.

Once the application has created the first and second data structures, the application causes any data which is to be transferred to the I/O device to be written to a particular virtual address within the address range defined for the transfer buffer. In this manner, the application program may transfer individual sequences of data to positions in the transfer buffer.

The application program commands a transfer of a particular sequence of data from the transfer buffer in memory to an I/O device in one embodiment by writing commands directly to the I/O control unit 16 (and thus the DMA engine) furnishing to the DMA engine the offset from the beginning of the transfer buffer at which the sequence of data starts and providing the size of the data to be transferred. The DMA engine receives the commands and causes the offset and size values to be written to the second and third registers 33 and 34 associated with the DMA engine 30 in the embodiment described. The DMA engine uses a state machine 45 to determine whether space is available in the I/O FIFO buffer before commencing any transfer. If space is available, the transfer may begin.

Since the DMA engine has a reference value pointing to the data structure which holds the physical address of the transfer buffer, the DMA engine may easily apply an offset into the buffer space and determine the main memory address of the data sequence without intervention by the operating system.

If rather than writing directly to the I/O device, the embodiment is such that the application writes commands with virtual addresses which are translated by the operating system to physical addresses, then the commands are furnished by the operating system to the I/O device and its associated DMA engine. The offset and size are then utilized with physical addresses in memory in the first data structure pointed to by the reference value in the register 32. In such a case, page tables are not required in local memory on the I/O device.

The DMA engine responds to the offset and size commands from the application program by determining the physical address and size of the sequence of data to be transferred in the transfer buffer area. The DMA engine begins the transfer of data from the transfer buffer and continues the operation for so long as there is data to be transferred as designated by the size of the data. In the embodiment utilizing the I/O control unit 16 and allowing direct writing, the data is transferred by the DMA engine and sent to the input FIFO buffer of the I/O control unit.

In one embodiment of the invention, the DMA engine includes circuits 40 and 41 for incrementing the value of the offset and decrementing the value of the size as each individual portion of data is transferred to the I/O device. When the transfer is complete, the DMA engine 30 consults the reference value in the fourth register 35 to find the second data structure 38. Since this data structure defines the notification area of main memory at which the notify structure is positioned, the DMA engine is able to determine the physical address in main memory of the notification area without consulting the operating system.

Essentially, the notify structure includes an indication of the status or condition of the DMA transfer operation, i.e., continuing or completed. The DMA engine writes a value to the notification area of memory indicating that the transfer operation is complete and (optionally) signals the central processing unit (typically by an interrupt) that the notification area of main memory is to be interrogated to determine the condition of the transfer operation. The central processing unit responds to the signal, reads the notify area, and determines that the transfer is complete.

All that is necessary to accomplish a transfer once the transfer and notify data structures have been established is that the application program write the data sequence to the buffer and transfer to the DMA engine the offset and length of the data to be transferred. Since the process of establishing of the first data structure causes the kernel driver to place a reference values pointing to the first and second data structures in the register 32 and the register 35 and causes the designated pages to be locked down in main memory, these commands furnish all that is necessary for the transfer to begin and complete. Once completed, the DMA engine consults the second data structure for the address of the notify area, stores the notify in the second notify area of memory, and (optionally) signals the central processing unit to read the notify area. When a read of the notify area indicates that the operation is complete, a next operation may be commenced.

It is not necessary that the DMA engine signal the central processing unit that a transfer operation is complete. In one embodiment of the invention, the central processing unit polls the notification area of memory to determine whether the operation is complete. This is especially advantageous. The data in the notification area is cached in the processor cache so that the central processor is only polling its cache. Moreover, the cache coherency policy of the cache assures that when the DMA places a notify indication in the notification area of memory, the change is immediately signaled by the memory management system which invalidates the cache line. This alerts the central processor on the next read of the cache that the cache entry is invalid, causing the central processor to go to memory to retrieve a new value and determine that the transfer has completed. This allows the processor to poll without the need to access main memory except when the notification actually occurs.

Another embodiment of the invention utilizes a register which is part of the DMA engine to store a notify indication which may be only a single bit. In such an embodiment, the DMA engine places the notify indication in the register and then may signal the central processing unit (e.g., by an interrupt) that the register should be read. Although this embodiment requires a read of an I/O register and is therefore slower than other embodiments, it does not require any space value comparisons by the central processing unit and is a fully function alternative. Alternatively, the central processing unit may continually poll the notification register.

The invention allows large amounts of data positioned at addresses in system memory to be transferred to the graphics accelerator by the DMA with a minimal number of starting commands from the central processor. As may be seen, once the data structure has been establish and data sequences have been moved to the transfer buffer, the transfer operation requires only two processor writes to define the offset and size values and a read of the notification buffer. Consequently, this is a very rapid operation. Moreover, when the read by the central processor is of a main memory notification area (or the processor cache), the read can be accomplished more rapidly than can a read of an I/O register as in the above described embodiment. An added advantage is that the DMA engine using the state machine 45 knows when the I/O control unit is ready for data, so data overflow is no longer a problem.

It should be noted that the wait for a notify from the DMA engine limits the speed at which sequential sequences of data can be transferred. Although one transfer by the DMA engine may be taking place while a new sequence of data is being transferred to the transfer buffer by the central processor, the second transfer cannot begin until the first has completed and the notification has been read by the central processor.

The process can be made even faster by increasing the number of transfer buffers in memory in which I/O data may be stored and associated notification areas. Doing so requires increasing the number of data structures defining transfer buffers and notification areas of memory. It also requires furnishing additional registers for the DMA engine to hold the reference values for these data structures and the offset and size values for the data sequences to be transferred. Although these requirements are significant, the increase in the number of transfer buffers allows an increase in the number of notify areas. Since the notify operation is the limiting factor in the operation, increasing the number of areas in memory defining notify areas allows a DMA engine to make use of multiple channels to accomplish transfers and essentially overlap those transfers without the need to wait for a first to complete the notify operation. With additional portions of memory and accompanying data structures, the commands required of the application program which must be executed by the central processing unit may be overlapped to utilize time otherwise unused by the processor. This allows much faster operations although it does increases the system requirements.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. Apparatus for rapidly transferring data under direction of an application program to an input/output (I/O) device comprising:
    computer implemented software means for defining a region of system memory as a transfer buffer,
    an I/O device including a direct memory access (DMA) circuit, the DMA circuit including:
        storage circuitry to indicate a sequence of data in the transfer buffer to be transferred to the I/O device,
        storage circuitry to indicate the physical position of the transfer buffer, and
        means to generate a transfer status notification.

2. Apparatus as claimed in claim 1 in which the means to generate a transfer status notification comprises a register for holding a transfer status notification.

3. Apparatus as claimed in claim 1 in which the means to generate a transfer status notification comprises storage circuitry to identify a notification area in system memory.

4. Apparatus as claimed in claim 3 in which means to generate a transfer status notification comprises circuitry to generate a transfer status notification to the notification area in system memory.

5. Apparatus as claimed in claim 1 in which means to generate a transfer status notification comprises circuitry to generate a signal to a processor indicating a transfer status change.

6. Apparatus as claimed in claim 1 further comprising:
    computer implemented software means for defining a region of system memory as a notification area, and
    in which the means to generate a transfer status notification comprises storage circuitry to identify the notification area in system memory.

7. Apparatus as claimed in claim 6 in which the computer implemented software means for defining a region of system memory as a notification area comprises means for defining a data structure identifying the region of system memory.

8. Apparatus as claimed in claim 6 in which the computer implemented software means for defining a region of system memory as a transfer buffer comprises means for defining a data structure identifying the region of system memory.

9. Apparatus as claimed in claim 1 in which the computer implemented software means for defining a region of system memory as a transfer buffer comprises means for defining a data structure identifying the region of system memory and for locking the region of memory described as a transfer buffer.

10. A computer comprising
    a central processing unit;
    a system bus;
    system memory; and
    apparatus on the system bus for rapidly transferring data under direction of an application program to an input/output (I/O) device comprising:
        computer implemented software means for defining a region of system memory as a transfer buffer,
        a direct memory access (DMA) circuit, the DMA circuit including:
            storage circuitry to indicate a sequence of data in the transfer buffer to be transferred to the I/O device,
            storage circuitry to indicate the physical position of the transfer buffer, and
            means to generate a transfer status notification.

11. A computer as claimed in claim 10 in which the means to generate a transfer status notification comprises a register for holding a status notification.

12. A computer as claimed in claim 10 in which the means to generate a transfer status notification comprises storage circuitry to identify a notification area in system memory.

13. A computer as claimed in claim 12 in which the means to generate a transfer status notification comprises circuitry to generate a notification to the notification area in system memory.

14. A computer as claimed in claim 13 in which the central processing unit polls to determine a change in the notification indicating a transfer status change.

15. A computer as claimed in claim 10 in which the means to generate a transfer status notification comprises circuitry to generate a signal to the central processing unit indicating a transfer status change.

16. A computer as claimed in claim 15 in which the central processing unit reads the notification indicating a transfer status change.

17. A computer as claimed in claim 10 further comprising:
    computer implemented software means for defining a region of system memory as a notification area, and
    in which the means to generate a transfer status notification comprises storage circuitry to identify the notification area in system memory.

18. A computer as claimed in claim 17 in which the computer implemented software means for defining a region of system memory as a notification area comprises means for defining a data structure identifying the region of system memory.

19. A computer as claimed in claim 10 in which the computer implemented software means for defining a region of system memory as a transfer buffer comprises means for defining a data structure identifying the region of system memory.

20. A computer as claimed in claim 10 in which the computer implemented software means for defining a region of system memory as a transfer buffer comprises means for defining a data structure identifying the region of system memory and for locking the region of memory described as a transfer buffer.

21. A direct memory access (DMA) circuit positioned with an input output device comprising
    a first register for storing a reference value pointing to a data structure which includes details of a portion of memory in which data is stored for transfer to the I/O device,
    two additional registers for storing an address and a range within the portion of memory at which the data is stored, and a fourth register for storing a reference value pointing to a second data structure which includes details describing a portion of memory at which a notification from the DMA circuit that a transfer of data has been completed may be stored.

22. A direct memory access (DMA) circuit which is physically positioned between a computer input/output bus and an input/output device, the DMA circuit storing a first reference value pointing to a first data structure which describes a transfer buffer portion of system memory in which data is stored for transfer to the I/O device, a second reference value pointing to a second data structure which describes a notification area of system memory in which a notification is placed defining the status of a transfer of data, a value determining a position within the transfer buffer portion of system memory, and a value determining a range within the first transfer buffer portion of system memory, the DMA circuit including circuitry for accomplishing the transfer of data from the transfer buffer portion of system memory and for placing a notification in the notification area of system memory.

23. A method for rapidly transferring data under direction of an application program to an input/output (I/O) device in a computer comprising the steps of:

defining and locking down a region of system memory as a transfer buffer, indicating to a direct memory access (DMA) circuit a sequence of data in the transfer buffer to be transferred to the I/O device, transferring the sequence of data in the transfer buffer to the I/O device using the DMA circuit, notifying a processor that the transfer of the sequence of data is complete.

24. A method as claimed in claim 23 in which the step of notifying a processor that the transfer of the sequence of data is complete comprises placing an indication in a DMA register.

25. A method as claimed in claim 23 in which the step of notifying a processor that the transfer of the sequence of data is complete comprises placing an indication in a notification area in system memory.

26. A method as claimed in claim 24 further comprising a step of the central processing unit polling memory to determine a change in the notification area in system memory.

27. A method as claimed in claim 24 in which the step of notifying a processor that the transfer of the sequence of data is complete further comprises signaling the central processing unit to read the notification area in system memory.

28. A method as claimed in claim 23 in which the step of defining and locking down a region of system memory as a transfer buffer comprises generating a data structure defining the region of system memory, and identifying the data structure to the DMA circuit.

29. A method as claimed in claim 23 comprising the further step of generating a data structure defining a notification area of system memory, and in which the step of notifying a processor that the transfer of the sequence of data is complete comprises:

identifying the data structure defining a notification area to the DMA circuit, and placing a notification in the notification area.

* * * * *